United States Patent Office

2,987,528
Patented June 6, 1961

2,987,528
MANUFACTURE OF CYCLOPENTADIENYL MANGANESE COMPOUNDS
Jerome E. Brown, Detroit, and Earl G. De Witt, Royal Oak, Mich., and Hymin Shapiro, Baton Rouge, La., assignors to Ethyl Corporation, New York, N.Y., a corporation of Delaware
No Drawing. Filed July 24, 1957, Ser. No. 673,766
2 Claims. (Cl. 260—429)

This invention relates to the manufacture of cyclopentadienyl manganese compounds and more particularly to the production of bis(cyclopentadienyl) manganese and cyclopentadienyl manganese tricarbonyl compounds, such as alkylcyclopentadienyl manganese tricarbonyls.

Cyclopentadienyl manganese tricarbonyl compounds have been found to be exceptionally effective antiknocks for use in fuel, for spark plug ignition internal combustion engines. These compounds not only have exceptional effectiveness as antiknocks but also many of these compounds, principally the liquid compounds, have auxiliary properties which make them entirely practical and desirable for commercial use. These auxiliary properties include high solubility in fuels, such as gasoline, and thermo-stability either alone or in gasoline which makes these compounds entirely satisfactory for use under the widely varying conditions to which gasoline and other fuels are normally subjected. Possibly of even greater importance, these compounds do not tend to form any appreciable deposits on the engine piston, valve and spark plug surfaces and likewise are not abrasive to the engine parts as are characteristic of iron compounds.

The cyclopentadienyl manganese tricarbonyl compounds are normally produced by carbonylation of bis-(cyclopentadienyl) manganese compounds. These bis-(cyclopentadienyl) manganese compounds have previously been produced in certain solvents, particularly ethers, by reaction of the corresponding cyclopentadienyl alkali metal compound with manganese halides, particularly the chloride. These bis(cyclopentadienyl) manganese compounds are then reacted with carbon monoxide, normally in the same solvent, to produce cyclopentadienyl manganese tricarbonyls. The above reactions are inhibited by relatively small quantities of water. Since the manganese halides have a considerable affinity for water, it is difficult to store large quantities of these manganese salts without contamination, as is necessary in large-scale commercial operation. Also, the manganese chloride and other halides when added to ether solutions have an extremely high heat of solution which, when combined with heat generated in the exothermic reaction, results in an unsatisfactorily high heat load in cooling of the reaction vessel on large-scale production. Moreover, the use of halides, particularly the chloride, in the reaction results in the formation of highly stable gels, particularly at elevated temperatures, e.g. above 130 to 135° C. While the manganese halide and alkali metal cyclopentadienyl compound can be reacted at lower temperatures to sometime avoid such gels, the reaction rate is relatively low and, in any event, the gel problem is not completely avoided since the carbonylation reaction must be conducted at gel-forming temperatures, i.e. above about 150° C. Thus, the gel formation is encountered when using manganous halides either in the alkali metal cyclopentadienyl reaction or in the carbonylation reaction or in both.

It is, accordingly, an object of this invention to provide an improved process for the manufacture of bis-(cyclopentadienyl) manganese compounds and cyclopentadienyl manganese tricarbonyl compounds. Another object is to provide a process of this type having a relatively high reaction rate and a high reactor throughput, and which avoids the formation of stable gels in the reaction mass. Still another object is to provide a process which is adapted to large-scale commercial production of cyclopentadienyl manganese tricarbonyl compounds, including the intermediate steps of forming the alkali metal cyclopentadienyl compound and converting this compound to the desired bis(cyclopentadienyl) manganese compound. A further object is to provide a process which has less an affinity to atmospheric moisture. Other objects and advantages of this invention will become more apparent from the following description and appended claims.

It has now been found that these and other objects of the invention are accomplished by reacting alkali metal cyclopentadienyl compound with a manganous salt of an organic acid, particularly derivatives of alkyl and aromatic acids. The organic salts of manganese, in contrast to the halide salts, do not readily absorb moisture from air and consequently these organic salts have considerable advantage in large-scale operation over the halide salts. Moreover, it is found that the tendency of gel formation is minimized or gels are completely avoided through the use of manganous salts of organic acids. Also, there is no heat of solution during the addition of the organic manganous salts, such as manganous acetate, to the alkali metal cyclopentadienyl compound solution which considerably reduces the heat load encountered in cooling the reaction vessel.

More specifically, the process of this invention comprises reacting a cyclopentadienyl alkali metal compound with a manganous salt at a temperature above about 100° C., preferably in a solvent selected from the group consisting of lower dialkyl glycol ethers and cyclic ethers. This reaction product is thereafter reacted with carbon monoxide at a temperature above about 150° C. The carbonylation reaction can be conducted in a wide variety of solvents including hydrocarbons, amines, alcohols, etc., but for convenience it is usually conducted in the same ether solvents as are used in the cyclopentadienyl alkali metal reaction.

The following are typical examples which illustrate the desirable features of this present invention. In these examples, all quantities are given in parts by weight.

EXAMPLE I

To a reactor provided with means for agitating and heating the reactants was added 150 parts of diethylene glycol dimethyl ether and 17.8 parts of sodium. The temperature of this mixture was then raised to about 119° C. and the system was agitated to disperse with liquified sodium. To this dispersion was then added with agitation 68 parts of methylcyclopentadiene over a period of about 150 minutes. The reaction after this period was 90 percent complete, based upon the quantity of hydrogen evolution. To this reaction product was then added 65 parts of manganous acetate. During the addition of the manganous acetate, the temperature of the reaction dropped from 119° C. to 110° C. The temperature of the reaction thereafter increased to about 135° C. wherein the solution became an orange-red color. A conversion to bis(methylcyclopentadienyl) manganese of 55 percent was obtained, based upon the manganese charged. A part of the above reaction product solution (67.2 parts) was then diluted with about 35 parts of diethylene glycol dimethyl ether and this solution was then subjected to carbon monoxide pressure (500 p.s.i.a.). The reaction mixture was heated to 165° C. Carbon monoxide uptake in the reaction represented 60 percent of theoretical and 79 percent of this carbon monoxide was utilized in the formation of the desired methylcyclopentadienyl manganese tricarbonyl. The product was recovered by distillation.

The purified methylcyclopentadienyl manganese tricarbonyl compound when mixed with gasoline increases appreciably the octane rating of the gasoline. The following Table I illustrates the effectiveness of methylcyclopentadienyl manganese tricarbonyl, using a commercial gasoline having an initial boiling point of 94° F. and a final boiling point of 390° F. The antiknock value of the fuel determined by the ratings are given in octane numbers for figures below 100 and in Army-Navy performance numbers for values above 100. The method of determining performance numbers is explained in the booklet, "Aviation Fuels and Their Effect Upon Engine Performance," NAVAER-06-5-501, USAF T.O. No. 06-5-54, published in 1951.

*Table I*

COMMERCIAL GASOLINE HAVING AN IBP OF 94° F. AND AN FBP OF 390° F.

$C_5H_7Mn(CO)_3$,
g. metal/gal.: Octane rating
0 ------------------------------ 83.1
1.0 ---------------------------- 92.7
2.0 ---------------------------- 95.8
3.0 ---------------------------- 98.0
5.0 ---------------------------- 102.0

EXAMPLE II

Example I is repeated except that tetrahydrofuran is used as the solvent and potassium is employed in place of sodium. Also, a more concentrated reaction solution (less solvent) is employed corresponding to a solvent to bis(cyclopentadienyl) manganese weight ratio of 0.63. Similar results are obtained.

EXAMPLE III

Example I is repeated except that manganous formate is reacted with cyclopentadienyl lithium in diethylene glycol dibutyl ether solvent. The cyclopentadienyl metal is prepared similar to Example I except that lithium metal and cyclopentadiene are used. Comparable quantities of cyclopentadienyl manganese tricarbonyl are produced.

EXAMPLE IV

Example I is repeated except that manganous naphthenate is reacted with methylcyclopentadienyl sodium. The methylcyclopentadienyl sodium in this instance is formed by reaction of metallic sodium with methylcyclopentadiene dimer at a temperature of 200° C. Following formation of the bis(methylcyclopentadienyl) manganese, the solvent is removed and replaced by methylcyclopentadiene dimer as the solvent during the carbonylation reaction.

EXAMPLE V

Example I is repeated except that indene is reacted with the metallic sodium to form bis(indenyl) sodium which is thereafter reacted with manganese acetate and then with carbon monoxide.

The following Table II illustrates other variations of the process of this invention as Examples 6–9, inclusive. In these examples, the procedure is essentially the same as Example I and similar results are obtained, except in certain examples a different manganese tricarbonyl compound is formed.

*Table II*

| Expl. No. | Alkali Metal Reaction | | | | Manganous Salt Reaction | | | Carbonylation Reaction | | |
|---|---|---|---|---|---|---|---|---|---|---|
| | Hydrocarbon | Alkali Metal | Hyd./Metal Mole Ratio | Temp., °C. | Mn Salt | Temp., °C. | MnX/MR Mole Ratio | CO Pressure | Temp., °C. | Solvent |
| VI | Methylcyclopentadiene | Na | 1.1:1 | 125 | Propionate | 135 | 1:1 | 400 | 180 | Diethylene glycol diethyl ether. |
| VII | n-Butylcyclopentadiene | Na | 0.9:1 | 140 | Butyrate | 175 | 1.05:1 | 350 | 165 | Diethylene glycol dibutyl ether. |
| VIII | Cyclopentadiene | K | 1.5:1 | 65 | 2-Ethyl hexoate | 165 | 1.3:1 | 500 | 170 | Toluene.[1] |
| IX | Methylcyclopentadiene | Na | 1:1 | 115 | Acetate | 170 | 1.1:1 | 400 | 185 | Cyclohexamine. |

[1] Diethylene glycol dimethyl ether employed in second step, toluene in the first and third steps.

Many bis(cyclopentadienyl) manganese and cyclopentadienyl tricarbonyl compounds can be produced in accordance with the present invention, in addition to those given in the above examples. In general, cyclopentadienyl or substituted cyclopentadienyl compounds containing a total of from about 5 to 20 carbon atoms can be produced by this invention. The cyclopentadienyl radical can be alkyl substituted or can be of the indenyl or fluorenyl type, including the alkyl derivatives of the latter type compounds. The preferred cyclopentadienyl manganese compounds of this invention contain cyclopentadienyl radicals having from 5 to 13 carbon atoms. Typical examples are bis(cyclopentadienyl) manganese, bis(methylcyclopentadienyl) manganese, bis (ethylcyclopentadienyl) manganese, bis(n-octyl cyclopentadienyl) manganese, bis(indenyl) manganese, bis(fluorenyl) manganese, and bis(phenyl methylcyclopentadienyl) manganese. Typical examples of cyclopentadienyl manganese tricarbonyl compounds which can be produced from the above bis(cyclopentadienyl) manganese compounds are methylcyclopentadienyl manganese tricarbonyl, cyclopentadienyl manganese tricarbonyl, n-octyl cyclopentadienyl manganese tricarbonyl, and the like.

CYCLOPENTADIENYL ALKALI METAL PREPARATION

Any of a number of general methods for the preparation of the cyclopentadienyl alkali metal compound can be employed, including the preparations described in British Patent 763,047 and U.S. Patent 2,777,887. These processes are conducted at relatively low temperatures, however, and have many inherent disadvantages, particularly with regard to the tendency of the sodium to agglomeration and low reaction rates. A more preferred operation uses the same ether solvents discussed in accordance with the present invention, particularly the lower dialkyl glycol ether type and the cyclic type, such as tetrahydrofuran. Moreover, the process is preferably carried out at temperatures above 100° C. which eliminates most of the problems of agglomeration of the sodium and of low reaction rates. When using a monomer feed, e.g. methylcyclopentadiene monomer, temperatures in the range of 100° to 140° C. are preferred. In some cases, it is desired to feed directly to the reactor the cyclopentadienyl dimer in which case the reaction is carried out at temperature above about 150° C. and preferably above 180° C.

The alkali metal and cyclopentadiene compound can be reacted in essentially stoichiometric quantities, except that it is normally desired to use a slight excess, e.g. from 5 to 20 percent, of the cyclopentadiene compound to assure complete reaction of the alkali metal.

The agitation in this reaction is not critical but should be sufficient to maintain the alkali metal in adequate dispersion.

The use of sodium as the alkali metal is prefererd over lithium, potassium and the other alkali metals since it is more readily available and is considerably cheaper.

BIS(CYCLOPENTADIENYL) MANGANESE PREPARATION

A wide variety of different organic manganese salts can be employed in the reaction. In general, the organic salts in which the organic radical has no greater than about 10 carbon atoms are preferred and, in addition, the aliphatic type acid salts give best results. Typical examples of suitable organic acid salts are manganous formate, manganous acetate, manganous propionate, manganous butyrate, manganous-2-ethyl hexoate, manganous benzoate and alkyl derivatives thereof and manganous salts of polynuclear organic acids, such as manganous naphthenate and alkyl derivatives thereof. The preferred organic manganous salts contain not greater than about 6 carbon atoms.

Suitable solvents for carrying out the reaction between the alkali metal cyclopentadienyl compound and the manganese salts are ethers and amines. The most preferred solvents are the ether types, particularly the lower alkyl digylcol ethers and cyclic ethers which can be subsequently used for reaction of the manganous salts. Best results are obtained with the glycol ethers. Typical examples of suitable solvents for this invention are diethyl ether, dibutyl ether, diethylene glycol dimethyl ether, diethylene glycol diethyl ether, diethylene glycol dibutyl ether, ethylene glycol methyl phenyl ether, propylene glycol dimethyl ether, propylene glycol diethyl ether, and the like. The higher glycol ethers are sometimes desirable, such as tetraethylene glycol dimethyl ether, tetraethylene glycol dibutyl ether, and the like. Other solvents are tetrahydrofuran, dioxane, dibutyl amine, cyclohexyl amine and the like.

The quantity of solvent to be employed in this reaction can vary from about 0.2 mole of solvent per mole of bis(cyclopentadienyl)manganese product up to about ten moles per mole of the bis(cyclopentadienyl) manganese compound. The more concentrated recipes are preferred because, in may cases, the yields are improved with the more concentrated reaction mass and the reaction product can be fed directly to the carbonylation reaction without solvent removal. Faster reaction rates are also obtained with these solvent proportions in the carbonylation reaction. Of course, an important additional advantage is the increase production obtained from a unit volume of reaction space.

The agitation in this reaction is not critical but is very important to obtain satisfactorily rapid reaction between the cyclopentadienyl alkali metal compound and the manganese salt. The degree of agitation, however, for a given reaction rate depends to some extent upon the temperature of the reaction. Normally, the agitation employed can range from about 0.001 to about 1.0 horsepower per gallon of reaction mixture, although, preferably, agitation of from about 0.005 to about 0.1 horsepower per gallon is employed. In general, a higher horsepower per gallon input agitation is necessary with smaller vessels.

The temperature of this reaction can vary from about 100° to 250° C. and preferably is carried out between about 125° to 200° C. The higher temperatures, e.g., above 160° C. are preferred, due to the faster reaction rate obtained under these conditions.

The manganous salt to cyclopentadienyl alkali metal compound mole equivalent ratio is preferably maintained at about 1:1 but can vary from about 0.8:1 to about 1.5:1. Generally, it is preferred to use a mole equivalent ratio slightly above 1:1, e.g. above 1.05:1. At lower mole ratios, the utilization of the alkali metal compound is reduced, whereas at higher ratios, the quantity of byproduct formed is increased.

CARBONYLATION REACTION

The solvent type and quantities for the carbonylation reaction is usually similar to that discussed above with regard to the preparation of the bis(cyclopentadienyl) compound. However, in the carbonylation reaction, other solvents can be used such as, for example, hydrocarbon solvents of either the aliphatic or aromatic type, including cycloaliphatic. Typical examples of hydrocarbon solvents which are suitable are hexane, heptane, methylcyclopentadiene dimer, low polymers of ethylene or styrene, benzene, toluene, xylene, naphthalene and alkyl derivatives of aromatic hydrocarbons.

The temperature of the carbonylation reaction can vary from about 100° C. up to decomposition temperature of the reactants or products but generally is conducted at temperatures above about 150° C. No particular advantages are obtained with temperatures above about 250° C.

The carbon monoxide pressure is not critical and can vary from about atmospheric to 5,000 p.s.i.g. or more. However, a more preferred range is between about 200–500 p.s.i.g. since conversion rates below 200 are relatively slow and expensive pressure equipment is required at the more elevated pressures.

This application is a continuation-in-part of our copending applications Serial No. 297,392, filed July 5, 1952, and Serial No. 527,124, filed August 8, 1955, now U.S. Patent No. 2,839,552, dated June 17, 1958 and Serial No. 325,224, filed December 10, 1952, and now Patent 2,818,-416, issued December 31, 1957.

We claim:

1. A process for producing a bis(cyclopentadienyl hydrocarbon)manganese comprising reacting a cyclopentadienyl alkali metal in which the alkali metal is bonded directly to a carbon of the five ring carbons comprising the cyclopentadienyl group with a manganous salt of an organic acid having not greater than about 10 carbon atoms in a dialkyl glycol ether solvent at a temperature between about 100 and 250° C.

2. A process for producing a cyclopentadienyl hydrocarbon manganese tricarbonyl comprising reacting a cyclopentadienyl hydrocarbon alkali metal in which the alkali metal is bonded directly to a carbon of the five ring carbons comprising the cyclopentadienyl group with a manganous salt of an organic acid having not greater than about 10 carbon atoms in a dialkyl glycol ether solvent at a temperature between about 100° and 250° C., and thereafter reacting the reaction product with carbon monoxide at a temperature between about 150° and 250° C.

References Cited in the file of this patent

FOREIGN PATENTS

| 1,097,071 | France | Feb. 9, 1955 |
| 1,108,869 | France | Sept. 14, 1955 |

OTHER REFERENCES

Fischer et al.: Zeit. fur Naturforsch, vol 9b, page 618 (1954).

Wilkinson et al.: "Chemistry and Industry," pp. 307–8, Mar. 13, 1954.

Birmingham et al.: "Naturwissenschaften," vol. 42, page 96 (1955).